UNITED STATES PATENT OFFICE.

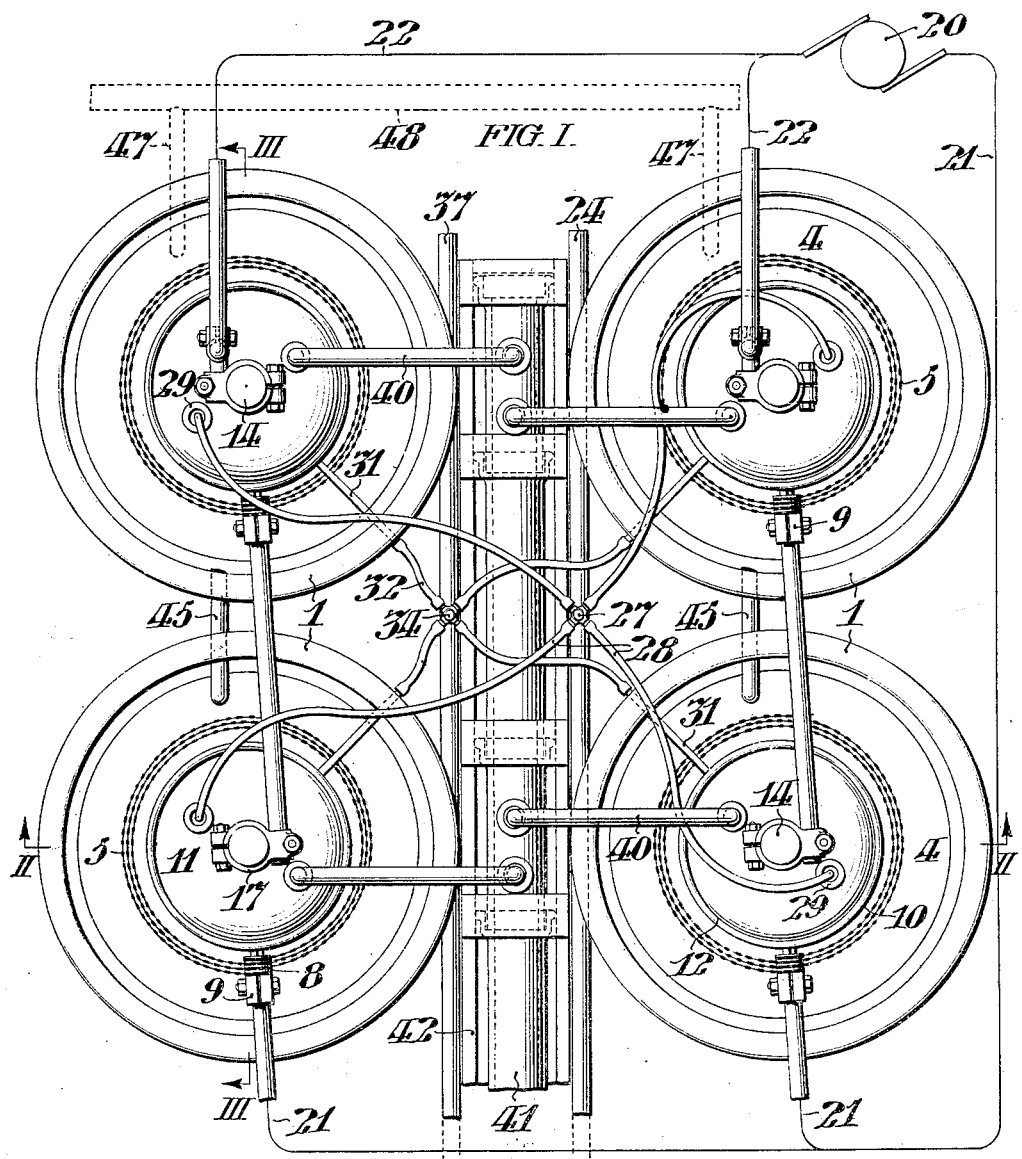

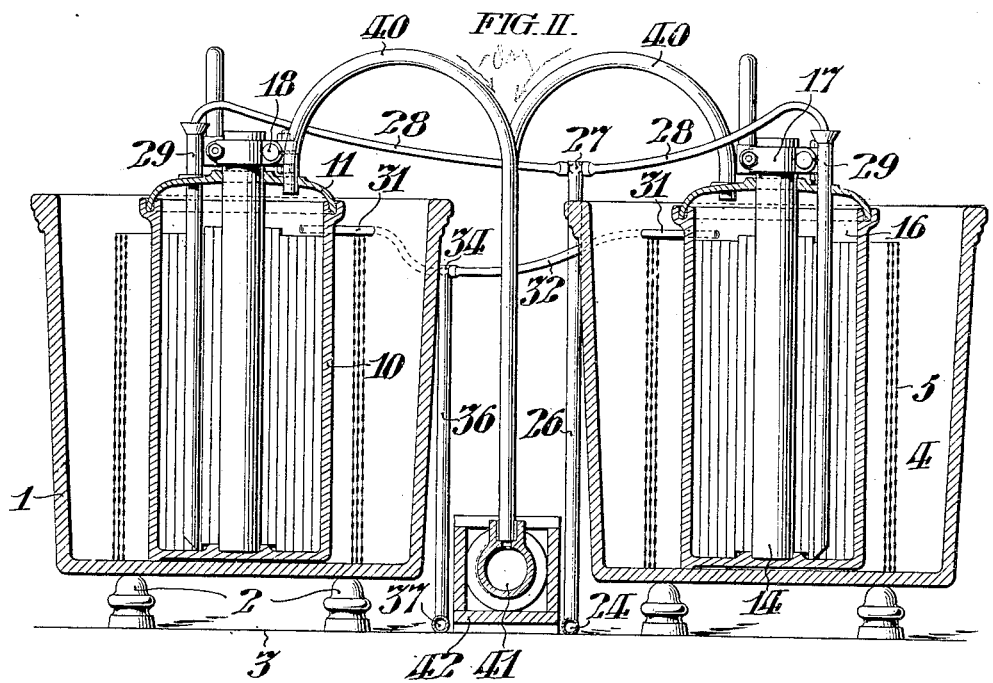

MARCUS RUTHENBURG, OF LOCKPORT, NEW YORK.

ELECTROLYTIC APPARATUS.

No. 898,785.     Specification of Letters Patent.     Patented Sept. 15, 1908.

Application filed January 18, 1907. Serial No. 352,901.

*To all whom it may concern:*

Be it known that I, MARCUS RUTHENBURG, of Lockport, in the county of Niagara and State of New York, have invented a certain new and useful Improvement in Electrolytic Apparatus, whereof the following is a specification, reference being had to the accompanying drawings.

It is the object of my invention to provide an apparatus of convenient construction wherein a solution of sodium chlorid may be continuously decomposed to form and separately discharge sodium hydrate solution and chlorin; the sodium hydrate solution being concentrated during its progression through the apparatus to the point of discharge and the chlorin being discharged from the apparatus in such manner as to be utilized by absorption in lime or water, as hereinafter described.

The apparatus hereinafter described comprises a plurality of cells, and, means arranged to continuously deliver into each cell a supply of one fluid, viz., strong brine, and continuously discharge therefrom, three fluids, viz., spent brine, sodium hydrate solution and chlorin. The circulation of brine in each cell is localized with respect to the anode by a porous cup which secludes the anode from the atmosphere, and, the strong brine is delivered to the cells by a conduit common to all of them and having respective branches extending to the bottom of each cup. The spent brine is withdrawn from said cups by respective branches extending from the upper portions thereof to a common conduit; and said two brine conduits are connected with the source of supply, so that the same solution is repeatedly used. The chlorin is discharged from each cup through a tube extending from the top thereof and connected with a conduit common to all of the cells; the pressure in said conduit being maintained so far below that of the atmosphere as to progress the chlorin to the region of the material for absorbing it. The cathodes each consist of a cylinder of wire cloth, formed of volute layers encircling the local porous cup. The cathode chambers in said cells are open to the atmosphere and connected by pipes extending from the bottom of each cell, exterior to its porous cup, to the top of the next cell in the group, exterior to its cup; so that the lower concentrated portion of the sodium hydrate solution in the cathode chamber in each cell is delivered to the cathode chamber of the next cell and so on throughout the series; whereby the specific gravity of said solution is increased from the first to the last cell; the concentrated solution being discharged from the last cell.

My invention includes the various novel features of construction and arrangement hereinafter more definitely specified.

In the drawings, Figure I, is a plan view of an apparatus comprising a group of four cells, constructed and arranged in accordance with my invention. Fig. II, is a vertical sectional view taken on the line II, II, in Fig. I. Fig. III, is a vertical sectional view taken on the line III, III, in Fig. I.

In said figures; each cell comprises an outer tank 1, conveniently supported by glass insulators 2, above the level of the floor 3, and contains in its cathode chamber 4, which is open to the atmosphere, a cathode 5, consisting of several volute layers of wire cloth, secured in spaced relation to a connecting bar 6, by bolts 7, and washers 8, and each bar 6, is provided with a connecting clamp 9, at its upper end. Said electrode 5, encircles a porous cup 10, provided with a cover 11, which is hermetically sealed at its junction 12, with said cup 10. Said cup secludes from the atmosphere the anode which comprises a large carbon rod 14, and smaller rods 15, filling the anode chamber 16, within said cup. Said electrodes 14, are conveniently provided with connecting clamp yokes 17, and respective conductor rods 18, connecting the cathode 5, of one cell with the anode 14 of the next succeeding cell. I have shown in Fig. I, four cells arranged in two series and connected in series parallel relation with the generator 20, by the leads 21, and 22. However, any desired number of said cells may be employed and electrically connected in any convenient manner.

The conduit 24 which is conveniently supported on the floor 3, as shown in Fig. II, leads from a suitable source 25, of strong brine, and is connected in common with all of the cells in the group, by branches comprising vertical pipes 26, having distributing heads 27, connected by respective flexible tubes 28, with the delivery tubes 29, which are conveniently formed of glass extending through the respective covers 11, of the porous cups 10, to the bottom of the latter, as shown in Fig. II. The brine thus delivered to the bottom of each porous cup 10, is decomposed in the latter, and the spent brine overflows through the respective branches comprising the discharge pipes 31, which extend from the upper portions of the cups 10, through the walls of the tanks 1, as shown in Figs. I and II, and, are connected by the flexible tubes 32, with receiving heads 34, on the vertical pipes 36, leading to the conduit 37, which is thus connected in common to all of the cells and is conveniently supported by the floor 3, as shown in Fig. II. Said conduit 37, leads to the original source 25, so that the spent brine discharged from the cells through said conduit 37, is returned to the main supply of brine with which it is mixed, renewed and again used. The advantage of this arrangement is that the formation of complex salts of Na and Cl is minimized and their ill effects avoided.

The chlorin liberated within the porous cups 10, is withdrawn therefrom through the branch tubes 40, which respectively depend through the covers 11, and are connected in common with the chlorin conduit 41, which is conveniently supported in the housing 42, on the floor 3. The pressure in said conduit is maintained slightly below that of the atmosphere so as to progress the chlorin to a region where it may be absorbed in slaked lime in powdered or granular form, in milk of lime or, in plain water which is circulated over broken lime stone.

Each of the porous cups 10, being thus continuously maintained charged to the level of its overflow pipe 31, with an almost saturated clarified solution of NaCl, the cathode chambers 4, surrounding said porous cups 10, in the tanks 1, are maintained charged with cathodic sodium combined with water, i. e. sodium hydrate solution. Said solution overflows through the outlet pipes 45, which extend from the bottom of each cell to the top of the next succeeding cell in the group, so that the portion of the solution of greatest specific gravity is withdrawn from the bottom of each cell and delivered at the top of the next; the solution of greatest specific gravity in the first cell becoming the solution of the least specific gravity in the second cell, and so on to the end of the series; whereby the solution increases in specific gravity as it passes from cell to cell. The concentrated solution may be discharged from the last cell of the series through the branch pipes 47, and conduit 48, for boiling down or such other utilization as may be desired.

I do not desire to limit myself to the precise details of construction and arrangement herein described, as it is obvious that various modifications may be made therein without departing from the essential features of my invention as defined in the following claims.

I claim:—

1. In an electrolytic apparatus, the combination with cells, comprising outer tanks and inner porous cups, means to exclude the atmosphere from said cups, and electrodes respectively interior and exterior with respect to said cups; of means connecting said electrodes with a generator; means connecting said cups with a supply of sodium chlorid solution arranged to deliver said solution into said cups at the bottom thereof and withdraw it from the top thereof; means arranged to direct a solution of sodium hydrate from the bottom of one cell, exterior to its cup, to the top of the next cell, exterior to its cup; and means connecting said porous cups, at the tops thereof, with a chlorin conduit leading to absorbing material, substantially as set forth.

2. In an electrolytic cell, an electrode comprising a cylinder formed of volute layers of wire cloth; and, means maintaining said layers in spaced relation, comprising a connection bar extending parallel with the axis of said cylinder, washers interposed between said layers, and bolts connecting said washers with said bar, substantially as set forth.

3. In an electrolytic cell, an electrode comprising a cylinder formed of volute layers of wire cloth; and, means maintaining said layers in spaced relation, comprising a connection bar, washers interposed between said layers, and bolts connecting said washers with said bar, substantially as set forth.

4. In an electrolytic apparatus, the combination with cells, comprising outer tanks and inner porous cups, means to exclude the atmosphere from said cups, and electrodes respectively interior and exterior with respect to said cups; of means connecting said electrodes with a generator; means connecting said cups with a supply of liquid, arranged to deliver said liquid into said cups at the bottom thereof and withdraw it from the top thereof; means arranged to direct another liquid from the bottom of one cell, exterior to its cup, to the top of the next cell, exterior to its cup; and means connecting said porous cups, at the tops thereof, with a conduit leading to absorbing material, substantially as set forth.

5. In electrolytic apparatus, the combination with a series of cells; of porous cups in the respective cells; anodes and cathodes in said cells, respectively within and without said porous cups; a conduit common to all of said cups, having branches arranged to respectively deliver fluid therein; and outlet pipes arranged to direct a fluid from the bottom of each cell, exterior to its cup, to the top of the next cell, exterior to its cup; whereby the concentrated portion of fluid in the cathode chamber of each cell may be delivered to the cathode chamber of the next succeeding cell, substantially as set forth.

In testimony whereof, I have hereunto signed my name at London, England, this 28" day of December A. D. 1906.

MARCUS RUTHENBURG.

Witnesses:
　H. D. JAMESON,
　R. F. WILLIAMS.